United States Patent
Lipton et al.

(10) Patent No.: US 7,633,666 B2
(45) Date of Patent: Dec. 15, 2009

(54) ZSCREEN® MODULATOR WITH WIRE GRID POLARIZER FOR STEREOSCOPIC PROJECTION

(75) Inventors: Lenny Lipton, Los Angeles, CA (US); Matt Cowan, Bloomingdale (CA)

(73) Assignee: Real D, Beverly Hills, CA (US)

( * ) Notice: Subject to any disclaimer, the term of this patent is extended or adjusted under 35 U.S.C. 154(b) by 52 days.

(21) Appl. No.: 11/820,619

(22) Filed: Jun. 20, 2007

(65) Prior Publication Data

US 2008/0316375 A1   Dec. 25, 2008

(51) Int. Cl.
*G02F 1/03* (2006.01)
*G02F 1/1335* (2006.01)

(52) U.S. Cl. .............. 359/246; 359/256; 359/259; 349/18

(58) Field of Classification Search ............ 359/246
See application file for complete search history.

(56) References Cited

U.S. PATENT DOCUMENTS

| | | | |
|---|---|---|---|
| 4,792,850 A | 12/1988 | Lipton et al. | |
| 6,636,276 B1 | 10/2003 | Rosenbluth | |
| 6,721,096 B2 | 4/2004 | Bruzzone et al. | |
| 2006/0092380 A1 | 5/2006 | Salsman et al. | |
| 2007/0070260 A1* | 3/2007 | Wang | 349/18 |
| 2008/0143965 A1* | 6/2008 | Cowan et al. | 353/8 |

OTHER PUBLICATIONS

Notification of Transmittal of International Search Report and Written Opinion for PCT/US2008/007603 mailed Sep. 30, 2008.

* cited by examiner

*Primary Examiner*—Scott J Sugarman
*Assistant Examiner*—Dawayne A Pinkney
(74) *Attorney, Agent, or Firm*—Baker & McKenzie LLP

(57) ABSTRACT

A projection design configured for use with a projector having a projector lens is provided. The device includes at least one pi-cell or pi-cell electro-optical modulator in combination with a wire grid polarizer mounted proximate the pi-cell(s). The design may include a cleanup polarizer between the pi-cell(s) and the wire grid polarizer and optionally a protective window between the wire grid projector and projection lens. The device may be oriented at an angle substantially differing from the axis of the projector lens. The resultant device includes spacing for airflow and can offer improved performance, particularly in heating, over designs previously available.

16 Claims, 3 Drawing Sheets

_US 7,633,666 B2_

ZSCREEN® MODULATOR WITH WIRE GRID POLARIZER FOR STEREOSCOPIC PROJECTION

BACKGROUND OF THE INVENTION

1. Field of the Invention

The invention is generally directed to the art of stereoscopic motion picture projection, and more specifically to a polarization switch or modulator of improved performance characteristics using a wire grid polarizer (WGP).

2. Description of the Related Art

Stereoscopic motion pictures are frequently projected using the polarization method for image selection. An important variation of polarization transmission uses the REAL D/StereoGraphics ZScreen®, which has been described previously in issued and co-pending patents, U.S. Pat. No. 4,792, 850 and U.S. patent application Ser. No. 11/430,598. The ZScreen modulator is mounted on a projector, and production units are mounted directly to the body of the projector and hung in front of the projection lens.

An important concern in the ZScreen is the sheet polarizer, which has been available as a product for 60 or 70 years. The sheet polarizer is also called an absorption polarizer because it creates polarized light by absorbing at least half of the visible light. The absorbed light energy goes into heating the polarizer, and for the ZScreen embodiment this requires a cooling fan. Even with the fan the polarizer will fade in time and lose its desirable characteristics because of the fugitive nature of the dyes employed. Without the fan, the polarizer will quickly degrade when used with a modern theatrical theater projector.

The size of the modulator, dictated by the need to dissipate the radiant flux from the projector, precludes mounting the device to the lens itself because of its bulk and weight and thus must be mounted to the projector body. Mounting the modulator some distance from the lens allows for more heat dissipation since the area of the projected beam and thus the flux density is larger at some distance. There are several manufacturers of projectors and each uses a different form-factor, meaning that a different mounting scheme must be devised for each projector. But just about all of the lenses have the same outside dimensions so a light enough ZScreen could be mounted directly on the lens.

To achieve a high contrast ratio (also known as dynamic range), the transmission of dye stuff sheet polarizers must be reduced, and such sheet polarizers have relatively low transmission. Getting light on the screen is a key performance parameter for movie projection. Sheet polarizers with the required contrast ratio have a transmission of approximately 40%. Theoretically, a polarizer of this type could achieve a 50% transmission, but in fact, as noted, dye stuff sheet polarizers do not achieve this level of transmission with the desired contrast ratio performance. In addition, sheet polarizers have some degree of turbidity that reduces image ANSI (American National Standards Institute) contrast, a standard measurement using a checkerboard pattern. ANSI contrast is not to be confused with polarizer contrast ratio, but instead refers to an objective method for determining the range of values from dark to light within the image.

Thus the electro-optics of the ZScreen setup currently need a large surface area so that heat can be dissipated. Accordingly, the ZScreen device, for the reasons given here, becomes bulky and heavy; it requires larger mounting hardware; it requires a fan; and it needs to be held farther from the projection lens to spread out the luminous flux over a larger surface area to promote cooler operation.

Based on the foregoing, it would be advantageous to provide a ZScreen design having reduced size and spacing considerations while providing successful cooling of the device in projection environments. It would also be beneficial to overcome the aforementioned drawbacks present in previously known projection systems.

SUMMARY OF THE INVENTION

According to a first aspect of the present design, there is provided a polarization modulator device configured for use with a projector having a projector lens. The device includes at least one pi-cell or pi-cell electro-optical modulator in combination with a wire grid polarizer mounted proximate the pi-cell(s). The design may include a cleanup polarizer between the pi-cell(s) and the wire grid polarizer and optionally a protective window between the wire grid projector and projection lens. The device may be oriented at an angle substantially differing from the axis of the projector lens. The resultant device includes spacing for airflow and can offer improved performance, particularly in heating, compared with designs previously available.

According to a second aspect of the present design, there is provided a method of projecting stereoscopic images. The method includes projecting light energy through a projector lens, receiving the light energy at a wire grid polarizer and transmitting polarized light energy, and receiving the polarized light energy at a plurality of pi-cells and transmitting resultant light energy.

These and other objects and advantages of the present invention will become apparent to those skilled in the art from the following detailed description of the invention and the accompanying drawings.

DETAILED DESCRIPTION OF THE INVENTION

The present design seeks to increase the optical quality of the projected stereoscopic image by increasing the transmission of the ZScreen modulator through use of a Wire Grid Polarizer (WGP), resulting in a higher efficiency polarization modulator offering both greater transmission and ANSI contrast. In addition the present design reduces the size and weight of the projection ZScreen so as to make a package easier to install and mount directly on a projector lens. By using a wire grid polarizer, the design reduces the complexity of the prior product by eliminating a cooling fan, thus making the device more robust, smaller, and not susceptible to cooling fan failure. Moreover, dyestuff and similar polarizers fade with the passage of time and become less efficient, whereas the use of a WGP maintains polarization efficiency with the passage of time.

The present design therefore employs a WGP to reduce the size of the device and eliminate the cooling fan. This size and corresponding weight reduction allows for the unit to be attached to the lens rather than to the body of the projector, making it easier to handle in installation and during operation.

Figure 1:
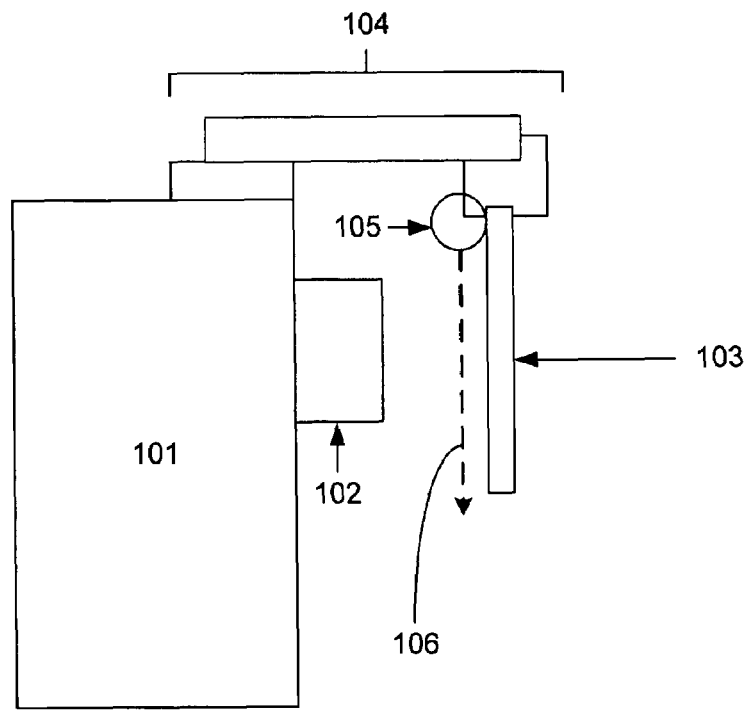
FIG. 1 shows the present mounting scheme for a ZScreen modulator.

FIG. 1 shows a previously available ZScreen modulator implementation, which shows projector 101, projection lens 102, the ZScreen modulator assembly 103, and mounting hardware 104. Cooling fan 105 is required to prevent burning of the sheet polarizer, and cooling fan 105 expels air in direction 106.

Figure 2:
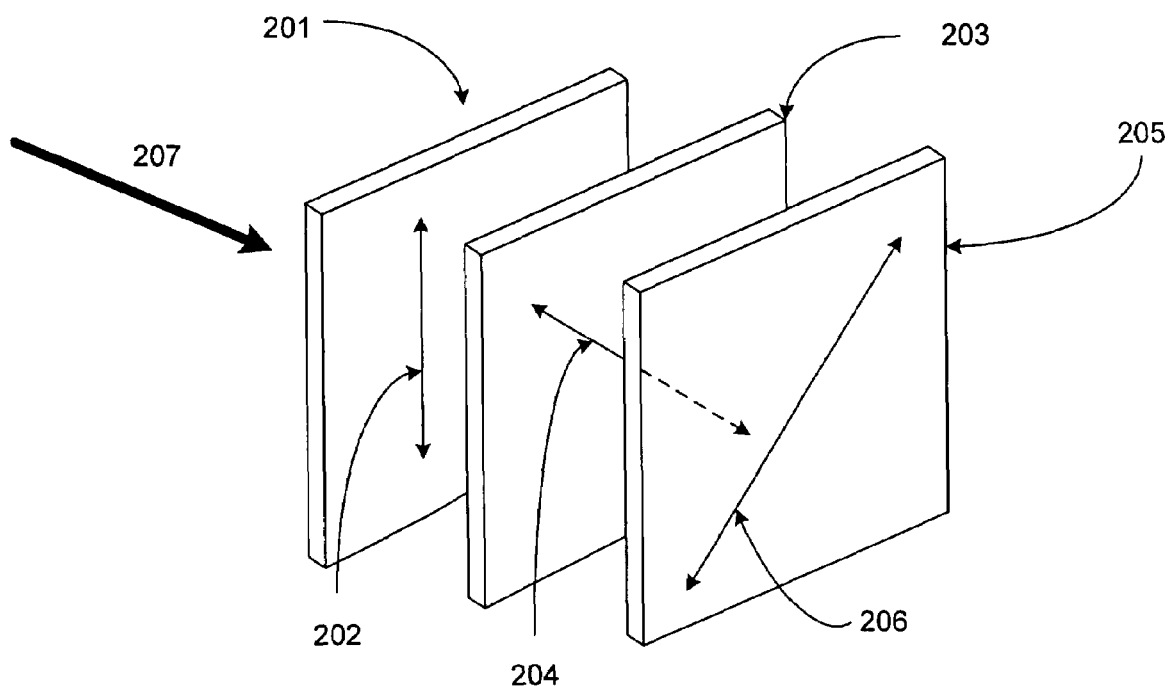
FIG. 2 illustrates the construction of the ZScreen modulator.

FIG. 2 illustrates the constituent components of a typical, previously available ZScreen modulator, which consists of a polarizer 201 whose axis is given by arrowed line 202. First pi-cell electro-optical modulator 203 has rub axis 204 and a second pi-cell is shown at 205, with rub axis 206.

Operation of the ZScreen is generally understood by those skilled in the art, and won't be dwelled on at length. Unpolarized light 207, from the projector (not shown) passes through the polarizer 201. The combined action of the pi-cells 203 and 205 produces the required circularly polarized light. One cell is driven to a high voltage and the other is driven to a low voltage. The resultant phase shift of the two parts produces a vector sum equal to quarter-wave retardation. The light that has been polarized by sheet polarizer 201 then passes, in effect, through a retarder whose axis is toggled, in synchrony with the movie (or video) frame rate, through 90 degrees. This produces left-handed, and then right-handed, circularly polarized light synchronized to the video field rate so that successive left and right perspective views are associated with a different polarization characteristic. The image is projected onto a polarization-conserving screen (not shown) and viewed by audience members wearing polarization analyzers (also not shown), resulting in the audience seeing a stereoscopic image.

An important concern in this arrangement is the sheet polarizer 201, which absorbs at least half of the visible light. The absorbed light energy heats the polarizer, thus requiring the action of the cooling fan 105. Without the fan, the polarizer will fade in time and lose its desirable characteristics because of the fugitive nature of dyes and dyestuffs.

All of the components 201, 203, and 205 may be sandwiched together and laminated with index matching adhesive to improve transmission and contrast ratio. Also, the air to material surfaces are typically AR (anti-reflection) coated (not shown) to improve transmission. This ensemble is shown in FIG. 1 as system 103, which is hung and mounted with hardware 104 in front of lens 102.

The mechanical assembly or hardware 104, shown mounted to the top of the projector, is only representative, and given here in one particular form for didactic purposes. There are other ways to mount the ZScreen assembly to the projector; for example, the ZScreen can be mounted on a stand in front of the projection lens.

Some clearance must be made between the front of the lens and the ZScreen so that air flow produced by fan 105 can take place. If the ZScreen is mounted in close proximity to the lens without an air gap, the sheet polarizer 201 will degrade. Therefore, steps need to be taken to produce air flow, where this air flow results in cooling of the device.

Figure 3:
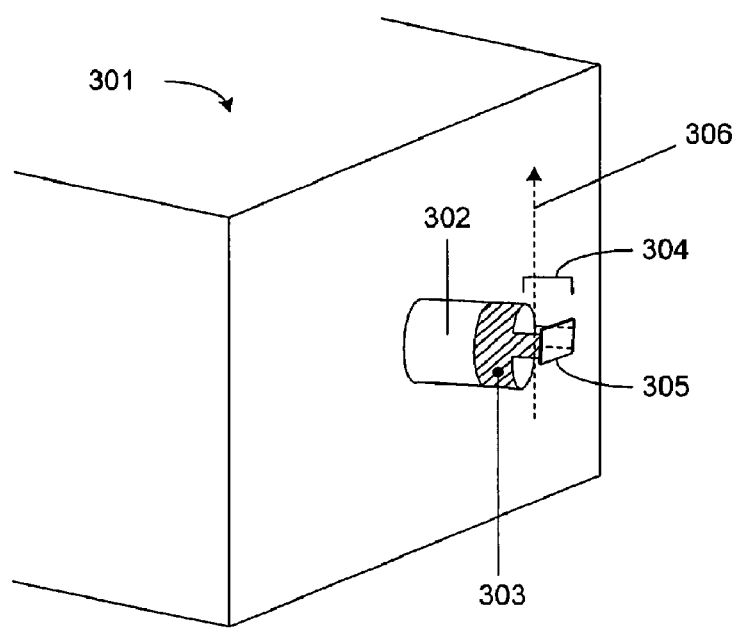
FIG. 3 is the WGPZS (wire grid polarizer ZScreen) attached directly to the lens itself rather than to the body of the projector.

FIG. 3 shows projector 301 with projection lens 302. A mounting collar 303 is shown for the WGPZS (Wire Grid Polarizer for the ZScreen) and the WGPZS assembly is shown as device 305. An air gap 304, allowing for convection cooling, is shown between the front of the projection lens and the WGPZS ensemble 305. Dashed arrow 306 represents the convection current necessary for cooling of the WGPZS. This mounting configuration is shown by way of example and those skilled in the art will readily grasp that other mounting arrangements can readily be fabricated and employed.

Figure 4:
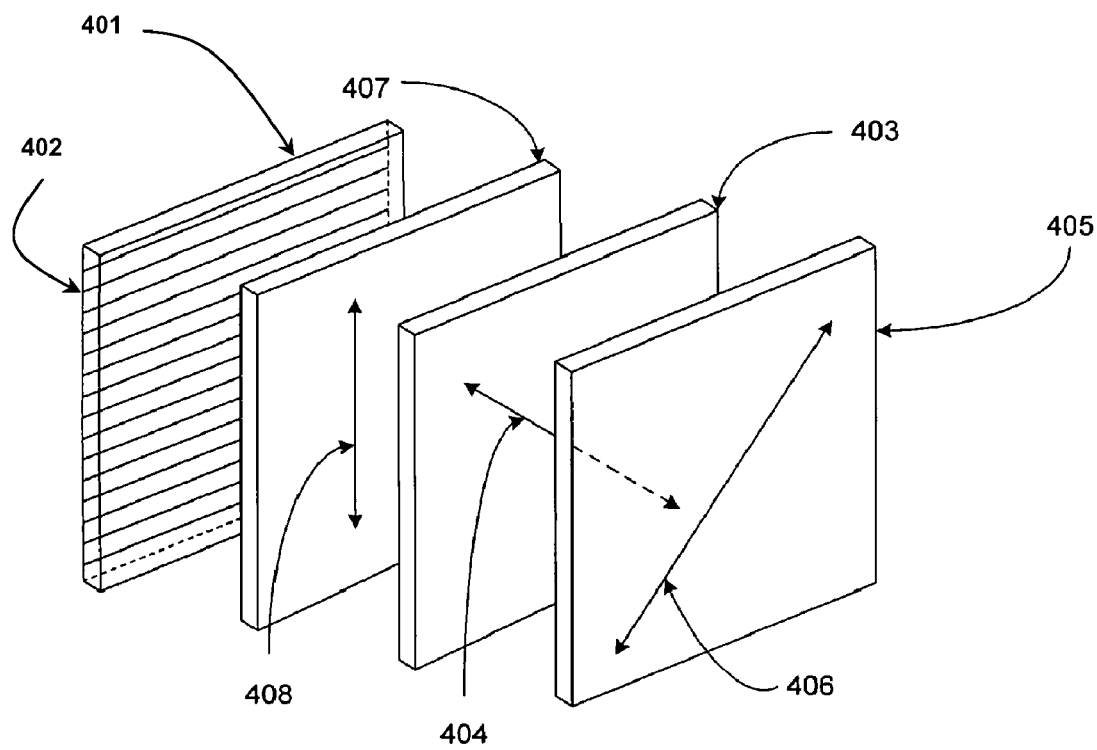
FIG. 4 illustrates the constituent components of a ZScreen employing a wire grid polarizer.

FIG. 4 is an exploded drawing that shows the components of the WGPZS assembly. Wire grid polarizer 401 has parallel lines 402 that indicate the aluminum grid wire structure of the wire grid polarizer. The WGP is placed so that its grid surface is closest to the projection lens, and because of its delicate nature it must be protected by a clear layer such as a cover glass (not shown). A cleanup polarizer 407, with axis 408, is shown and its purpose will be explained. Pi-cell 403 has rub axis 404 shown by a double-headed arrow. Second pi-cell 405 has rub axis 406 orthogonal to the rub axis 404 of pi-cell 403. These mutually orthogonal rub axes are at 45 degrees to the horizon, and are bisected by the polarization axis of WGP 401 and by the axis 408 of cleanup polarizer 407.

Because of the physics of the WGP, the polarization axis is orthogonal to the direction of the grid lines 402; thus the axis of the cleanup polarizer is shown at right angles to the direction of the length of the wires.

In the past, WGPs have been employed to work efficiently in the infrared region, but with advances in nanotechnology and deposition techniques they now are operating in the visible spectrum. By way of reference regarding the use of wire grid polarizers, the following are cited: Perkins, et al., U.S. Pat. No. 6,122,103 entitled "A Broadband Wire Grid Polarizer for the Visible Spectrum"; and another publication of interest is by Yu and Kwok, from *The Journal of Applied Physics*, vol. 93, no. 8, entitled "Optical Wire-Grid Polarizers at Oblique Angles of Incidence," both of which are incorporated herein by reference.

In general, a wire grid polarizer includes multiple parallel conductive electrodes supported by a dielectric substrate. The pitch of the electrodes, or the spacing between electrodes, is denoted by p. A light source producing light energy incident on the WGP produces a plane of incidence orthogonal to the electrodes. The wire grid polarizer 100 divides this beam into a specularly reflected component and a non-diffracted transmitted component. Light with S polarization has the polarization vector orthogonal to the plane of incidence, and thus parallel to the electrodes. Light with P polarization has the polarization vector parallel to the plane of incidence and thus orthogonal to the conductive elements.

The wire grid polarizer, unlike the sheet polarizer, produces polarized light not through absorption, but rather uses a birefringent structure with the S polarization encountering a mirror and the S polarization is reflected while the P polarization encounters a dielectric film and is transmitted. The birefringent nature takes every ray of light, over a broad incident angle, and delivers a good polarization state. The WGP is very efficient at transmitting P polarization and reflecting S polarization. In practice between 5% and 10% of the incident energy can be absorbed in the WGP, as compared to 55% to 60% in the sheet polarizer. The WGP also does not change its properties over a period of time, since it does not use fugitive dyes.

To manufacture an absorption polarizer, stress is induced in a plastic material such as polyvinyl alcohol by stretching, and a dye such as iodine is introduced. The long chain of iodine molecules performs a similar function to that of the wire grid polarizer, but in the iodine case absorption of photons takes place rather than reflection, and the sheet polarizer becomes heated. This difference in characteristics is critical to the success of the present design insofar as heating of the polarizer is concerned. For a sheet polarizer the passage of flux, especially when deployed close proximity to a projection lens, reduces the longevity of the device.

Projectors and projection lenses used in the digital cinema, for example, produce a great deal of light and heat is mostly concentrated in a small area. The heat will rapidly destroy an uncooled absorption sheet polarizer. The wire grid polarizer is fabricated from aluminum and glass, and not subject to fading or degradation with time or temperature. In one version of the design using parts as shown in FIG. 4, the WGP, the cleanup polarizer, and the two pi-cells can be laminated together. In other embodiments, the WGP is not necessarily laminated but can be tipped at an angle to reflect light away from the projection lens as described below with reference to FIG. 6.

In the case of the production ZScreen using sheet polarizers, a relatively large device is used to help dissipate heat over a large area. In the case of a wire grid polarizer a large polarizer area is not necessary, since the WGP will not deteriorate because of the passage of flux. The result is that the wire grid polarizer ZScreen can be held close to the projection lens and can be a much smaller device than a sheet polarizer ZScreen.

The WGPZS requires an open air gap 305 so that convection currents 306 can occur and minimize or prevent heat buildup. The collar 303 mounted or attached to projection lens 302 can be readily fashioned using any feasible collar design. Collar 303 can be a ring design with a press-fit or a clamp that could be tightened by other means (similar to a hose clamp). Attached to this clamp or adaptor is the WGPZS assembly. The air gap 305 is provided to serve a cooling function. This is but one of many mounting arrangements, and others could be readily fashioned and used by one skilled in the art.

Because the wire grid polarizer ZScreen is physically much closer to the projection lens, it can be much smaller, meaning a reduction in both size and weight. Moreover, further weight and size reduction is realized due to the absence of a cooling fan. This in turn means physical installation and handling is much simpler for the installer, and for the projectionist in the event that the device must be separated from the projection lens.

A great simplification occurs, practically speaking, when using the WGPZS because it becomes unnecessary to mount the polarization modulator to the projector. In the case of the previous design shown in FIG. 1, it is necessary to go to some lengths to ensure that a decent quality mount to the projector body is provided. Three major providers of theatrical-quality digital projectors currently produce these types of devices, each using a Texas Instruments DMD (digital micro-mirror device), which is particularly well suited for field-sequential stereoscopic imaging. Each manufacturer employs a different projector form factor, requiring the design of three completely different mounting means, which leads to complexity in production and unnecessary expense.

However, currently produced projectors all use the same set of projection lenses, made by Konica-Minolta, which have the same external dimensions, including outer diameter. As a result, a single collar or adaptor can be used for all lenses and all projectors employing the WGPZS. Even if this were not the case, mounting to the lens is far simpler than mounting to the projector housing.

Figure 5:
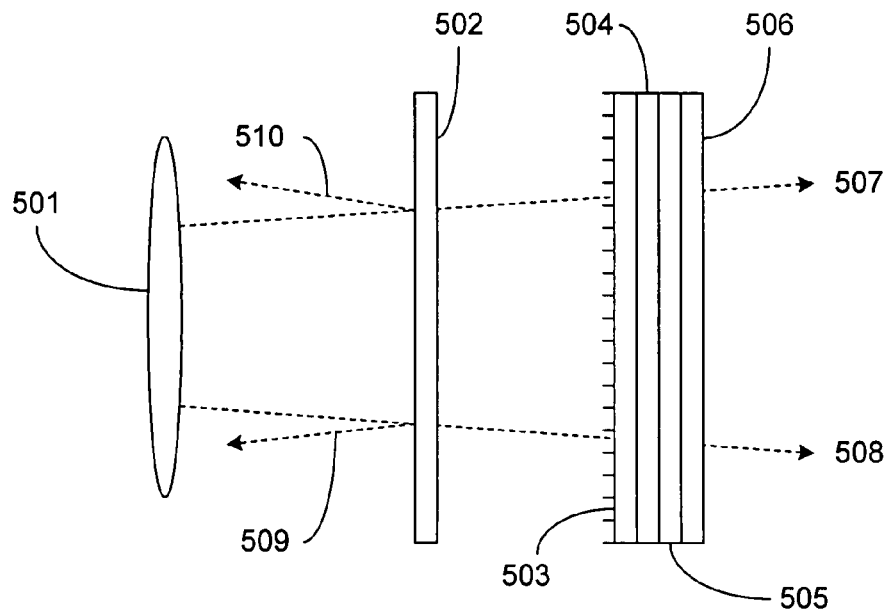
FIG. 5 shows the light rays' paths emerging from the projection lens and reflected off the WGPZS back to the lens with the lens axis orthogonal to the surface of the modulator.

FIG. 5 is a cross-sectional view of the wire grid polarizer ZScreen device. Projector lens 501 has an AR coated (both sides) cover glass 502 to protect the surface of the wire grid polarizer 503. The wire grid polarizer 503 is not in physical contact with the cover glass 502 since that could damage the WGP's surface. The horizontal hatched lines indicate the front surface of the WGP 503 and also suggest the surface structure, namely hatched or spaced apart. Cleanup polarizer 504 is chosen for high transmission, and may have a relatively low contrast ratio and is, capable of being produced by those skilled in the art. Pi-cell 505 is the front pi-cell and pi-cell 506 is the rear pi-cell of the modulator combination similar to the arrangement described in FIG. 2. Where possible, air to material surfaces should be anti-reflective (AR) coated.

The wire grid polarizer in a stereoscopic projection system, all by itself, produces less dynamic range that the conventional ZScreen using a high contrast ratio sheet polarizer. Therefore, a cleanup polarizer is virtually always required, as understood by experts in the art of polarization management. The cleanup polarizer 504 is a high transmission polarizer with a low dynamic range. The cleanup polarizer 504 is responsible for a minor loss of transmission, whereas its relatively low dynamic range is multiplicative with the dynamic range of the WGP 503. Therefore, the transmission of the device is only slightly reduced whereas the dynamic range is vastly increased.

The wire grid polarizer 503 reflects half of the luminous flux back in the general direction of the lens. The WGP 503 is not subjected to flux deterioration (fading) since it is a reflective device and not an absorptive device. The cleanup polarizer 504 is subjected to little deterioration because of the flux reflected by the WGP 503. The cleanup polarizer 504, like other similar dyestuff polarizers, will deteriorate with time; but its deterioration is very much slower under these circumstances since it is protected by the WGP 503. Also, in the event of deterioration, the combination of the WGP 503 and the cleanup polarizer 504 produces such a high dynamic range such that any significant reduction in the dynamic range of the cleanup polarizer will take a relatively long time.

The device described herein is stable, far more stable than a conventional ZScreen with a sheet polarizer. The WGPZS does not require cooling and has a high dynamic range from the combination of wire grid and sheet polarizers. As is well known, all dyestuff polarizers fade; but this combination is one that has extreme longevity.

From FIG. 5, the extreme image forming rays from lens 501 are shown at points 507 and 508 as dashed lines with arrow heads. These rays are reflected off of the surface of the device. For simplification, the reflection is shown off of the surface of the protective window 502 but in fact reflection occurs at all boundaries of elements in the illustration with different indices of refraction. Protective window 502 is required to protect the fragile surface of the wire grid polarizer. Protective window 502 may be formed from glass, but similar protective transparent surfaces may be employed.

The surface of the wire grid polarizer 503 accounts for most of the reflections and will in most cases reflect approximately 50% of the light back in the direction of the lens. This might be a cause for concern, because that flux can return to the projector's arc lamp and overheat the lamp. However, only a small percentage of the wattage used by the arc lamp actually goes into visible flux. In other words, these lamps are inefficient, so that even though the lamp may be many thousands of watts in rating, only a few tens of watts of luminous flux pass through the lens.

Accordingly, only a small amount of total lamp power is reflected back to the lens, so any light reflected back into the lens is inconsequential because it makes up a small percentage of the overall power used by the lamp. In addition, the light is not reflected directly back into the lens since the angle of reflection is equal to the angle of incidence. Much of the image forming light is in the form of diverging rays 507 and 508. Thus most of the light is reflected away from the lens's central axis and direction, resulting in, generally speaking, very little cause for concern, such as excessive heat or component wear. Representative reflected rays are shown as rays 509 and 510.

The light reflected back into the lens and projection system may cause degradation in image contrast (ANSI) through internal reflections within the lens and projector optical assembly. This can be mitigated as shown below.

Figure 6:
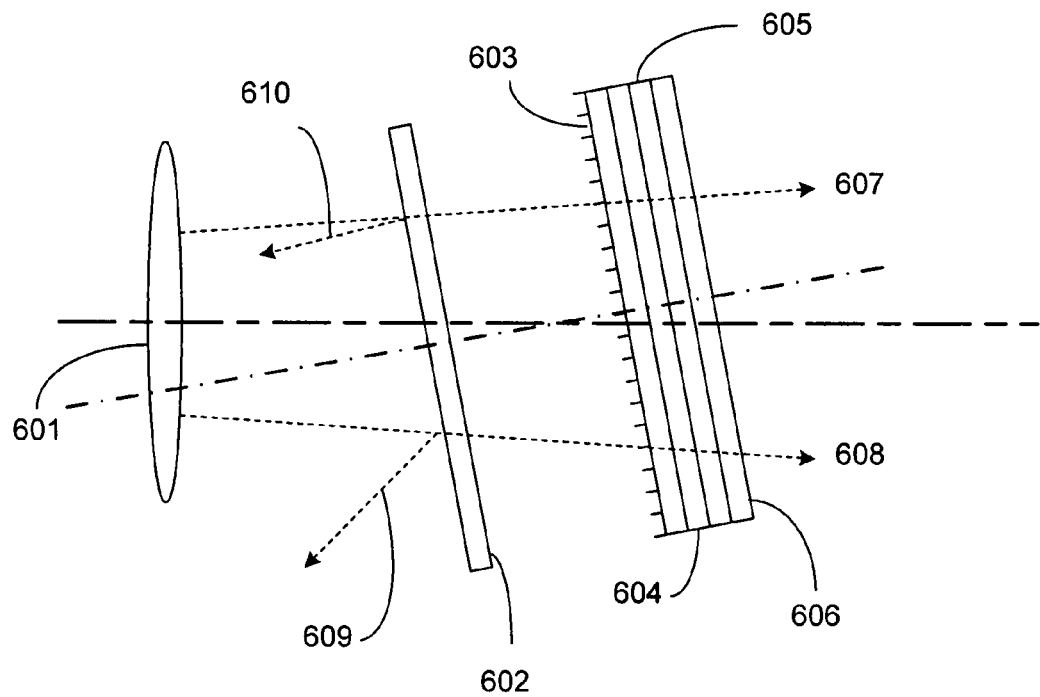
FIG. 6 shows the light rays' paths emerging from the projection lens and reflected back to the lens with the lens axes not orthogonal to the surface of the modulator.

FIG. 6 shows a somewhat different arrangement that can improve image contrast as well as reduce any minor heating of the lamp. Projection lens 601 is shown with AR coated cover glass 602, wire grid polarizer 603, cleanup polarizer 604, ZScreen modulator ensembles 605 and 606, made up of two pi-cells. As may be appreciated, the polarizers and modulator are tilted at an angle. The extreme rays of the lens are shown as rays 607 and 608, with representative reflected rays 609 and 610 also presented. Compared with the geometry of FIG. 5, a larger percentage of the reflected rays 609 and 610 are not returned to the projection lens, thereby further mitigating any issues with regard to cooling. In addition, the ANSI contrast of the image using this approach may be improved because more reflected rays are diverted from the image forming path and are not reflected back onto the DMD image engine.

Experiments in a projection booth using the WGPZS have shown that it is best to adjust the WGP so that the reflected rays are angled downward. This refers to reflections from port glass to the front surface of the Z screen, and not the reflection back into the lens. Such reflection tends to eliminate the annoying reflected light that can otherwise appear on the screen.

What has been described here is a ZScreen that has been enhanced and modified using a wire grid polarizer, where no fan is required and there is no possibility of the polarizer degrading. Any issues with regard to changes in polarization characteristics over time—in other words, a reduction in the dynamic range—are mitigated because the WGP does not depend on absorption but rather uses reflection. The device, because it does not require a fan and because it is relatively insensitive to high luminous flux, can be made significantly smaller than devices not employing the WGP. The resultant device is smaller and lighter, creating an improvement in mounting installation and serviceability.

Using the ensemble described here with the cleanup polarizer, the improvement in transmission is greater than 10 percent, and the dynamic range and other beneficial characteristics of the ZScreen are improved. A noticeable improvement in ANSI contrast is achieved. In other words, the image has more snap or sparkle. Dyestuff polarizers tend to have some degree of turbidity, but the wire grid polarizer by its nature does not, thereby tending to produce a superior image.

Other kinds of modulators can be substituted for the push-pull ZScreen-described herein, and that the teachings given here apply equally well to alternate modulators when used in place of the ZScreen.

The design presented herein and the specific aspects illustrated are meant not to be limiting, but may include alternate components while still incorporating the teachings and benefits of the invention, namely the modulator employing a wire grid polarizer as disclosed and claimed herein. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A stereoscopic polarization modulator device configured for use with a projector having a projector lens, the device comprising:
   a first pi-cell proximate to a second pi-cell; and
   a wire grid polarizer mounted proximate to the first pi-cell, the wire grid polarizer being positioned between the first pi-cell and the projector lens;
   wherein electrodes of the wire grid polarizer face toward the projector lens and are positioned on a side of the wire grid polarizer closest to the projector lens.

2. The device of claim 1, further comprising a cleanup polarizer positioned between the first pi-cell and the wire grid polarizer.

3. The device of claim 1, wherein the projector lens is oriented along a projection axis, and the first and second pi-cells and the wire grid polarizer are oriented along a component axis substantially offset from the projection axis.

4. The device of claim 1, further comprising mounting hardware configured to maintain the first and second pi-cells and the wire grid polarizer in an orientation spaced apart from the projector lens.

5. A stereoscopic polarization modulator device configured for use with a projector having a projector lens, the device comprising:
   a first pi-cell proximate to a second pi-cell;
   a wire grid polarizer mounted proximate to the first pi-cell, the wire grid polarizer being positioned between the first pi-cell and the projector lens, wherein electrodes of the wire grid polarizer face toward the projector lens;
   a cleanup polarizer positioned between the first pi-cell and the wire grid polarizer; and
   a protective window between the wire grid polarizer and the projector lens.

6. The device of claim 5, wherein the wire grid polarizer is spaced apart from the protective window and the protective window is spaced apart from the projector lens.

7. A stereoscopic polarization modulator device configured for use with a projector having a projector lens, the device comprising:
   a first pi-cell proximate to a second pi-cell;
   a wire grid polarizer mounted proximate to the first pi-cell, the wire grid polarizer being positioned between the first pi-cell and the projector lens, wherein electrodes of the wire grid polarizer face toward the projector lens; and
   a cleanup polarizer positioned between the first pi-cell and the wire grid polarizer;
   wherein the first and second pi-cells cleanup polarizer, and wire grid polarizer have substantially no space therebetween.

8. A method of projecting stereoscopic images, comprising:
   projecting light energy through a projector lens;
   receiving the light energy at a wire grid polarizer and transmitting polarized light energy; and
   receiving the polarized light energy at least one pi-cell and transmitting resultant light energy,
   wherein electrodes of the wire grid polarizer face toward the projector lens and are positioned on a side of the wire grid polarizer closest to the projector lens.

9. The method of claim 8, wherein polarized light energy from the wire grid polarizer passes to a cleanup polarizer before being received at the at least one pi-cell.

10. The method of claim 9, wherein light energy from the projector lens passes to a protective window before being received by the wire grid polarizer.

11. The method of claim 10, wherein the at least one pi-cell, cleanup polarizer, and wire grid polarizer have substantially no space therebetween.

12. The method of claim 11, wherein the wire grid polarizer is spaced apart from the protective window and the protective window is spaced apart from the projector lens.

13. The method of claim 8, wherein the projector lens is oriented along a projection axis, and the at least one pi-cell and wire grid polarizer are oriented along a component axis substantially offset from the projection axis.

14. The method of claim 8, wherein the at least one pi-cell and the wire grid polarizer are maintained in an orientation spaced apart from the projector lens.

15. A polarization modulator device, comprising:
- a first pi-cell electro-optical modulator having a first rub direction;
- a second pi-cell electro-optical modulator having a second rub direction differing from the first rub direction;
- a wire grid polarizer located proximate at least one of the first pi-cell electro-optical modulator and the second pi-cell electro-optical modulator and configured to receive light energy from a projector lens and transmit polarized light energy to the first pi-cell electro-optical modulator and the second pi-cell electro-optical modulator, wherein electrodes of the wire grid polarizer face toward the projector lens; and
- a protective window between the wire grid polarizer and the projector lens.

16. The polarization modulator device of claim 15, further comprising a cleanup polarizer positioned between at least one of:
- the first pi-cell electro-optical modulator and the second pi-cell electro-optical modulator; and
- the wire grid polarizer.

* * * * *